United States Patent
Lee et al.

(10) Patent No.: US 12,230,989 B2
(45) Date of Patent: Feb. 18, 2025

(54) BATTERY MANAGEMENT APPARATUS

(71) Applicant: LG Energy Solution, Ltd., Seoul (KR)

(72) Inventors: Won-Hoe Lee, Daejeon (KR);
Jeong-Wook Kim, Daejeon (KR);
Jun-Suk Kim, Daejeon (KR);
Seung-Jin Noh, Daejeon (KR);
Hyo-Seong An, Daejeon (KR);
Seog-Jin Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 527 days.

(21) Appl. No.: 17/640,188

(22) PCT Filed: Dec. 24, 2020

(86) PCT No.: PCT/KR2020/019155
§ 371 (c)(1),
(2) Date: Mar. 3, 2022

(87) PCT Pub. No.: WO2021/137540
PCT Pub. Date: Jul. 8, 2021

(65) Prior Publication Data
US 2022/0337074 A1    Oct. 20, 2022

(30) Foreign Application Priority Data
Jan. 3, 2020  (KR) .......... 10-2020-0000996

(51) Int. Cl.
*H02J 7/00* (2006.01)
(52) U.S. Cl.
CPC .......... *H02J 7/0063* (2013.01); *H02J 7/0048* (2020.01); *H02J 7/00712* (2020.01)

(58) Field of Classification Search
CPC ..... H02J 7/0063; H02J 7/0048; H02J 7/00712
(Continued)

(56) References Cited

U.S. PATENT DOCUMENTS

| 6,072,250 A | 6/2000 | Thandiwe et al. |
| 2010/0194348 A1* | 8/2010 | Wang .................... H01M 10/48 320/136 |

(Continued)

FOREIGN PATENT DOCUMENTS

| JP | 2011-229319 A | 11/2011 |
| JP | 5888187 B2 | 3/2016 |

(Continued)

OTHER PUBLICATIONS

Extended European Search Report dated Nov. 25, 2022, issued in corresponding European Patent Application No. 20909697.3.

(Continued)

*Primary Examiner* — Nathaniel R Pelton
(74) *Attorney, Agent, or Firm* — Morgan, Lewis & Bockius LLP

(57) ABSTRACT

Disclosed is a battery management apparatus capable of effectively reducing the current consumption of a component for waking up a microcontroller unit. The battery management apparatus includes a wake-up unit, a first power supply path, a first regulator, a first switching element, a feedback module, and a microcontroller unit configured to convert a sleep mode to a wake-up mode by receiving a wake-up signal from the wake-up unit and connected to the feedback module to turn off the first switching element.

11 Claims, 4 Drawing Sheets

(58) Field of Classification Search
USPC .......................................................... 320/103
See application file for complete search history.

(56) References Cited

U.S. PATENT DOCUMENTS

| | | | |
|---|---|---|---|
| 2012/0181987 A1* | 7/2012 | Lee | H02J 7/00308 |
| | | | 320/128 |
| 2013/0033233 A1 | 2/2013 | Noda et al. | |
| 2015/0212135 A1 | 7/2015 | Jin et al. | |
| 2016/0126839 A1 | 5/2016 | Chakkirala et al. | |
| 2016/0272082 A1 | 9/2016 | Chuang | |
| 2020/0052346 A1* | 2/2020 | Park, II | H02J 7/0036 |

FOREIGN PATENT DOCUMENTS

| | | |
|---|---|---|
| JP | 6014179 B2 | 10/2016 |
| JP | 2017-534243 A | 11/2017 |
| KR | 10-2011-0007660 A | 1/2011 |
| KR | 10-2012-0055811 A | 6/2012 |
| KR | 10-2012-0083023 A | 7/2012 |
| KR | 10-2016-0111339 A | 9/2016 |
| KR | 10-2019-0051477 A | 5/2019 |
| KR | 10-2007835 B1 | 8/2019 |
| KR | 10-2019-0137683 A | 12/2019 |

OTHER PUBLICATIONS

International Search Report issued in corresponding International Patent Application No. PCT/KR2020/019155 dated Apr. 26, 2021.

* cited by examiner

BATTERY MANAGEMENT APPARATUS

TECHNICAL FIELD

The present application claims priority to Korean Patent Application No. 10-2020-0000996 filed on Jan. 3, 2020 in the Republic of Korea, the disclosures of which are incorporated herein by reference.

The present disclosure relates to a battery management technology, and more particularly, to a battery management technology capable of effectively managing a power supplied to a component included in a battery pack.

BACKGROUND ART

A battery is applied to more diverse fields such as home appliances, motorcycles, vehicles (EV, HEV, PHEV) and large-capacity energy storage systems (ESS), as well as mobile devices such as smartphones, smart pads and notebooks.

One of the most important components of such a battery is a secondary battery capable of storing and discharging energy through charging and discharging. In general, a battery pack includes one or more secondary batteries (battery cells). In particular, recently, in order to secure output or capacity, a number of secondary batteries are often used to be connected in series and/or in parallel.

In addition, the battery often includes various components such as a microcontroller unit (MCU) and various integrated circuits (ICs), as well as the secondary battery. In particular, the microcontroller unit is a control part normally included in the battery pack, and when charging and discharging are performed between the battery pack and a load or between the battery pack and a charging device, the microcontroller unit may play a pivotal role in controlling the charging and discharging. For example, the microcontroller unit may determine whether a charge/discharge current or voltage of the battery pack is in a normal level to control a switch located on a charging/discharging path of the battery pack to be turned on or off.

The microcontroller unit may be in a sleep mode in certain situations, for the purpose of reducing power consumption or the like. For example, if the battery pack is not used for a long time or if the battery pack is being transported to a point of sale after being manufactured, the microcontroller unit may be placed in a sleep mode. However, the microcontroller unit in the sleep mode needs to be woken up at an appropriate time. In addition, in order to wake up the microcontroller unit in this way, a wake-up signal must be supplied from another component existing outside the microcontroller unit. In the battery pack, in many cases, a real time clock (RTC) and a CAN transceiver typically supply a wake-up signal to the microcontroller unit.

However, in the conventional battery pack, even if the microcontroller unit is in a sleep mode, an operating power should be continuously supplied to a module for waking up the microcontroller unit, for example a real time clock (RTC) and a CAN transceiver. Therefore, in the conventional battery pack, even when the battery pack is not used for a long time, current is continuously consumed due to the real time clock (RTC) and the CAN transceiver.

DISCLOSURE

Technical Problem

The present disclosure is designed to solve the problems of the related art, and therefore the present disclosure is directed to providing a battery management apparatus capable of effectively reducing the current consumption of a component for waking up a microcontroller unit, and a battery pack including the battery management apparatus.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery management apparatus for managing a battery pack including a battery cell, comprising: a wake-up unit configured to generate and send a wake-up signal; a first power supply path provided between the battery cell and the wake-up unit and configured to supply a first operating power from the battery cell to the wake-up unit; a first regulator provided on the first power supply path and configured to adjust a voltage magnitude of the first operating power supplied from the battery cell to a voltage magnitude available by the wake-up unit; a first switching element provided on the first power supply path and configured to turn on or off the flow of the first operating power on the first power supply path; a feedback module configured to supply an on/off signal from the first regulator to the first switching element; and a microcontroller unit configured to convert a sleep mode to a wake-up mode by receiving the wake-up signal from the wake-up unit and connected to the feedback module to turn off the first switching element.

Here, the wake-up unit may include a real time clock and a CAN transceiver.

In addition, the first switching element may be implemented using a FET, and the feedback module may be configured to supply an on/off signal to a gate terminal of the first switching element.

In addition, the feedback module may include a feedback path configured so that an operation signal is supplied from the first regulator to the first switching element; and a feedback switching element provided on the feedback path to turn on or off the feedback path.

In addition, the microcontroller unit may be configured to supply a control signal so that the feedback switching element is turned off.

In addition, the feedback module may further include an OR gate element located on the feedback path and configured to receive the operation signal supplied from the first regulator and the control signal supplied from the microcontroller unit and provide an output signal to the first switching element.

In addition, the battery management apparatus according to the present disclosure may further comprise a second power supply path provided between the battery cell and the microcontroller unit and configured to supply a second operating power from the battery cell to the microcontroller unit; a second regulator provided on the second power supply path and configured to adjust a voltage magnitude of the second operating power supplied from the battery cell to a voltage magnitude available by the microcontroller unit; and a second switching element provided on the second power supply path and configured to turn on or off the flow of the second operating power on the second power supply path, wherein the wake-up unit may be configured to generate and send the wake-up signal to the second switching element to turn on the second switching element.

In addition, the microcontroller unit may be configured to turn off the first switching element and the second switching element.

In addition, the microcontroller unit may be configured to turn off the first switching element and the second switching element in order when a SOC (State Of Charge) of the battery cell is lower than a reference value.

In another aspect of the present disclosure, there is also provided a battery pack, comprising the battery management apparatus according to the present disclosure.

In another aspect of the present disclosure, there is also provided an electronic device, comprising the battery management apparatus according to the present disclosure.

Advantageous Effects

According to the present disclosure, it is possible to reduce the current consumption of a wake-up module that supplies a wake-up signal to a microcontroller unit included in a battery pack.

In particular, according to an embodiment of the present disclosure, the power supplied to the real time clock and the CAN transceiver may be controlled by the microcontroller unit.

Thus, according to this embodiment of the present disclosure, it is possible to determine whether the microcontroller unit enters a sleep mode or a deep sleep mode that may further reduce the current consumption.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
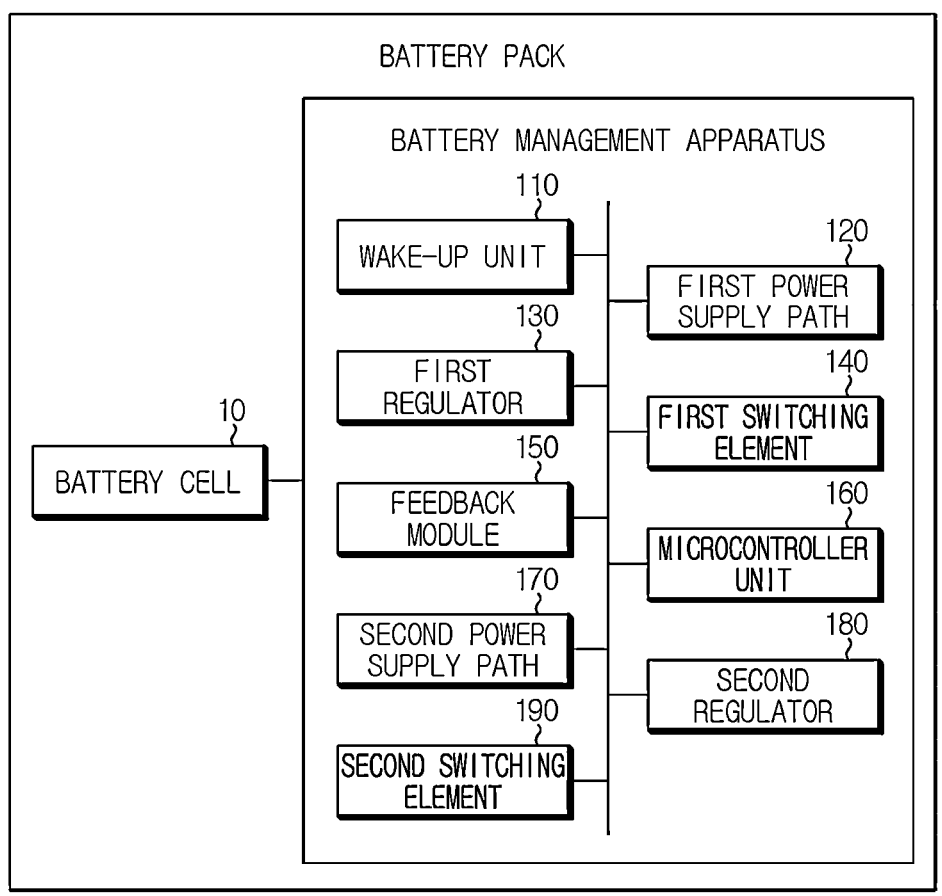
FIG. 1 is a block diagram schematically showing a functional configuration of a battery management apparatus according to an embodiment of the present disclosure.

FIG. 1 is a block diagram schematically showing a functional configuration of a battery management apparatus according to an embodiment of the present disclosure. Also, FIG. 2 is a diagram schematically showing some components of the battery management apparatus according to an embodiment of the present disclosure.

The battery management apparatus according to the present disclosure is an apparatus for managing a battery pack, and the battery pack may include a battery cell 10. Here, the battery cell 10 is a secondary battery that directly performs charging and discharging, and one or more battery cells may be included in the battery pack. In particular, the battery cells 10 may be connected in series and/or in parallel to increase the output and/or capacity of the battery pack. The battery cell may be connected to a charging/discharging path P provided in the battery pack to perform charging and discharging by receiving a charging current or supplying a discharging current through the charging/discharging path P.

Figure 2:
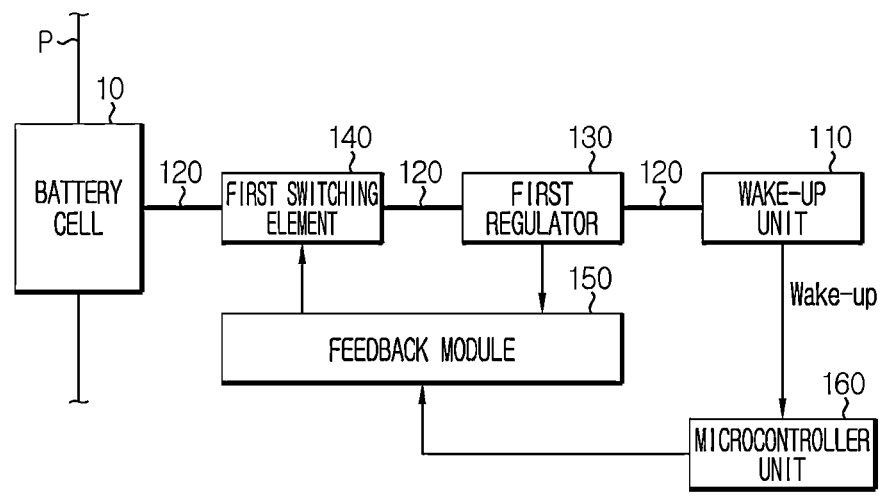
FIG. 2 is a diagram schematically showing some components of the battery management apparatus according to an embodiment of the present disclosure.

Referring to FIGS. 1 and 2, the battery management apparatus according to the present disclosure includes a wake-up unit 110, a first power supply path 120, a first regulator 130, a first switching element 140, a feedback module 150, and a microcontroller unit 160.

The wake-up unit 110 may generate a wake-up signal and transmit the wake-up signal to another component. In particular, the wake-up unit 110 may generate the wake-up signal and transmit the wake-up signal to the microcontroller unit 160. Here, the wake-up signal may be a signal for waking up a component such as the microcontroller unit 160, namely a signal for releasing the component from a sleep mode.

The first power supply path 120 may be provided between the battery cell 10 and the wake-up unit 110. In addition, the first power supply path 120 may be configured to provide a path through which a first operating power is supplied from the battery cell 10 to the wake-up unit 110. Accordingly, the wake-up unit 110 may perform its function or operation by the first operating power supplied through the first power supply path 120.

The first regulator 130 may be provided on the first power supply path 120. In addition, the first regulator 130 may be configured to adjust a voltage magnitude of the first operating power supplied from the battery cell 10. In particular, since the first operating power supplied through the first power supply path 120 is supplied to the wake-up unit 110, the first regulator 130 may be configured to change the voltage magnitude of the power supplied from the battery cell 10 through the first power supply path 120 into a voltage magnitude available by the wake-up unit 110. For example, the first regulator 130 may be configured to receive the power from the battery cell 10 and output the power at a voltage of 5V. Here, the first regulator 130 may be implemented as an LDO (Low Drop Out) regulator.

The first switching element 140 may be provided on the first power supply path 120. In addition, the first switching element 140 may be configured to turn on or off the flow of the first operating power on the first power supply path 120. For example, the first switching element 140 may be turned on to provide a path so that the first operating power is supplied to the wake-up unit 110 through the first power supply path 120. Alternatively, the first switching element 140 may be turned off to block the corresponding path so that first operating power is not supplied to the wake-up unit 110 through the first power supply path 120.

The feedback module 150 may be configured to supply an on/off signal from the first regulator 130 to the first switching element 140.

In particular, the feedback module 150 may receive the power from the first regulator 130 and provide a signal for turning on the first switching element 140 to the first switching element 140. Moreover, the feedback module 150 may continue to supply the turn-on signal from the first regulator 130 to the first switching element 140 even if the microcontroller unit 160 stops and comes into a sleep mode. Accordingly, even when the microcontroller unit 160 is in the sleep mode, the supply of the first operating power to the wake-up unit 110 may be maintained.

In addition, the feedback module 150 may turn off the first switching element 140 so that the supply of the first operating power to the wake-up unit 110 is blocked. In this case, since an operating power is not supplied to the wake-up unit 110, the wake-up unit 110 may stop at least some functions. For example, when the operating power is not supplied, the wake-up unit 110 may come into a state where all or at least some functions are not performed without performing a normal operation.

The microcontroller unit 160 is also referred to as an MCU and may generally perform various control or calculation tasks in the battery management apparatus of the battery pack. Typically, the battery pack may include a battery management system (BMS), and the microcontroller unit 160 may be mounted to the battery management system (BMS) in the form of a chip to perform various processing operations as a processor. For example, the microcontroller unit 160 may perform tasks such as detecting an overvoltage or overcurrent of the battery pack, controlling a charge switch and a discharge switch, and estimating a state of charge (SOC) or state of health (SOH). The microcontroller unit 160 may be implemented using various products such as an application specific integrated circuit (ASIC).

The microcontroller unit 160 may receive a wake-up signal from the wake-up unit 110. In addition, the microcontroller unit 160 may be configured to convert from a sleep mode to a wake-up mode when receiving the wake-up signal in a sleep mode. In general, the operating state of the microcontroller unit 160 may be classified into a wake-up mode in which the microcontroller unit 160 normally performs its function and a sleep mode in which the microcontroller unit 160 is in a standby state without performing the function. Here, the wake-up signal may be referred to as a signal for converting the microcontroller unit 160 from a sleep mode to a wake-up mode. That is, if the wake-up signal is transmitted from the wake-up unit 110 to the microcontroller unit 160, the microcontroller unit 160 in a sleep mode may be converted to a wake-up mode in which the microcontroller unit 160 may perform normal operation.

In particular, in the battery management apparatus according to the present disclosure, the microcontroller unit 160 may be connected to the feedback module 150. In addition, the microcontroller unit 160 may be configured to control the first switching element 140 to turn on or off. Further, the microcontroller unit 160 may be configured to turn off the first switching element 140 by transmitting a signal to the feedback module 150. In addition, if the first switching element 140 is turned off as described above, the first operating power supplied to the wake-up module may be blocked to stop all or some of the operations of the wake-up module.

According to this configuration of the present disclosure, by blocking the power supplied to the wake-up unit 110, it is possible to prevent an unnecessary current from being consumed by the wake-up unit 110. For example, in the case where the battery pack is not used for a long period of time, a current may not be consumed by the wake-up unit 110, so that the SOC (State Of Charge) of the battery pack may be secured at a certain level or higher.

Figure 3:
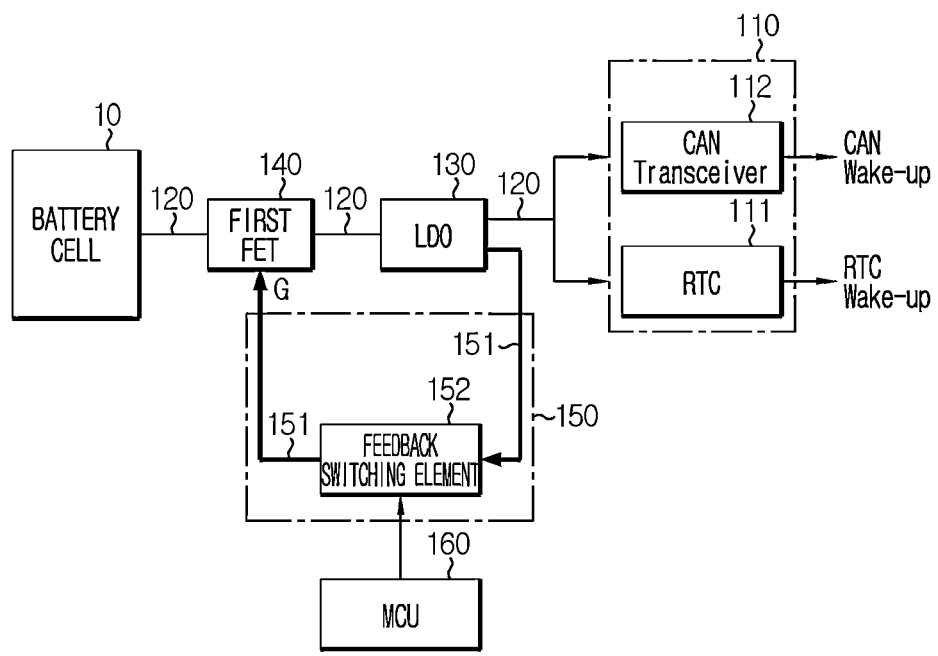
FIG. 3 is a diagram more specifically showing the configuration of the battery management apparatus according to an embodiment of the present disclosure.

FIG. 3 is a diagram more specifically showing the configuration of the battery management apparatus according to an embodiment of the present disclosure.

Referring to FIG. 3, the wake-up unit 110 may include a real time clock (RTC) 111 and a CAN transceiver 112. Here, the real time clock 111 may be configured to generate an interrupt at a set time to transmit a signal to another component. In particular, in the present disclosure, the real time clock 111 may transmit a wake-up signal to the microcontroller unit 160. In addition, the CAN transceiver 112 may convert a data stream between a CAN controller and a CAN bus level. Here, the CAN controller may be included in the microcontroller unit 160 or the like. The CAN transceiver 112 may include an electric circuit or the like for protecting the CAN controller. In particular, the CAN transceiver 112 may transmit a wake-up signal to the microcontroller unit 160. The battery management apparatus according to the present disclosure is not limited to any specific configuration of the real time clock 111 or the CAN transceiver 112, and various kinds of real time clocks 111 or CAN transceivers 112 known at the time of filing of this application may be employed, so detailed description thereof will be omitted.

In addition, as shown in FIG. 3, the first switching element 140 may be implemented as a FET (field effect transistor, denoted as a first FET in FIG. 3). In addition, the feedback module 150 may be configured to supply an on/off signal to a gate terminal of the first FET. That is, the gate terminal of the first FET serving as the first switching element 140 may be connected to the feedback module 150. In addition, a drain terminal and a source terminal of the first FET may be connected on the first power supply path 120. For example, the feedback module 150 may supply a voltage higher than a threshold voltage as a signal to the gate terminal of the first switching element 140, so that the first switching element 140 is turned on. Alternatively, the feedback module 150 may not supply a voltage higher than the threshold voltage as a signal to the gate terminal of the first switching element 140, so that the first switching element 140 is turned off. In this case, since the first operating power is not supplied to the real time clock 111 or the CAN transceiver 112, the wake-up unit 110 such as the real time clock 111 or the CAN transceiver 112 may stop and come into a sleep mode.

In addition, referring to FIG. 3, the feedback module 150 may include a feedback path 151 and a feedback switching element 152.

Here, the feedback path 151 may be configured to supply an operation signal from the first regulator 130 to the first switching element 140. That is, as shown in FIG. 3, one end of the feedback path 151 may be connected to the LDO serving as the first regulator 130, and the other end of the feedback path 151 may be connected to the first FET serving as the first switching element 140. Thus, an operation signal may be supplied from the first regulator 130 to the first switching element 140. In addition, by this operation signal, the first switching element 140 may be turned on or off.

The feedback switching element 152 may be provided on the feedback path 151 to turn on or off the feedback path 151. That is, the feedback switching element 152 may be turned on so that an operation signal is supplied from the first regulator 130 to the first switching element 140 through the feedback path 151. In this case, the first switching element 140 may be turned on or maintain a turn-on state. Alternatively, the feedback switching element 152 may be turned off so that an operation signal is not supplied from the first regulator 130 to the first switching element 140 through the feedback path 151. In this case, the first switching element 140 may be turned off or maintain a turn-off state.

Preferably, the microcontroller unit 160 may be configured to supply a control signal for turning on or off the feedback switching element 152. That is, as shown in FIG. 3, the microcontroller unit 160 may be connected to the feedback switching element 152 to supply a control signal capable of turning on or off the feedback switching element 152. In particular, the microcontroller unit 160 may supply a control signal so that the feedback switching element 152 is turned off. Here, if the feedback switching element 152 is turned off, the first FET 140 may be turned off, and the first operating power supplied through the first power supply path 120 may not be supplied to the wake-up unit 110 such as the RTC 111 or the CAN transceiver 112 any longer. Therefore, the RTC 111 or the CAN transceiver 112 may not perform a normal operation, but may stop the operation or perform only some operations as a sleep mode.

According to this implementation configuration of the present disclosure, the supply of signal through the feedback path 151 may be controlled by the microcontroller unit 160. Accordingly, the wake-up unit 110 such as the RTC 111 or the CAN transceiver 112 may stop the operation by the microcontroller unit 160. Therefore, unnecessary current consumption by the RTC 111 or CAN transceiver 112 may be prevented or reduced.

Figure 4:
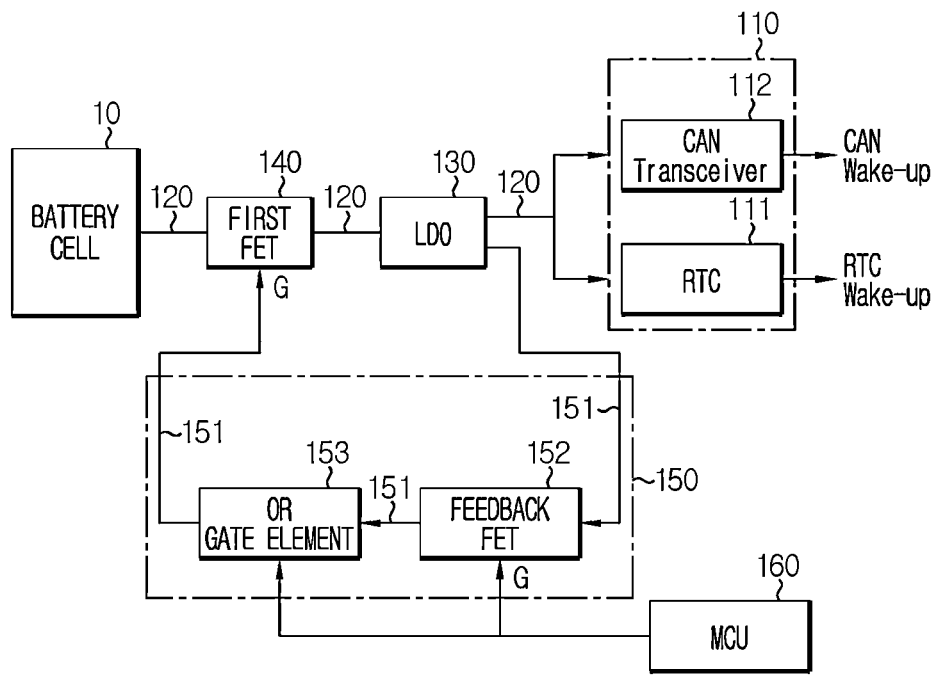
FIG. 4 is a diagram schematically showing a battery management apparatus according to another embodiment of the present disclosure.

FIG. 4 is a diagram schematically showing a battery management apparatus according to another embodiment of the present disclosure. In this embodiment, features different from the former embodiment will be described in detail, and features identical or similar to the former embodiment will not be described in detail.

Referring to FIG. 4, the feedback module 150 may further include an OR gate element 153. Here, the OR gate element 153 may be located on the feedback path 151 to receive the operation signal supplied from the first regulator (LDO) 130 and the control signal supplied from the microcontroller unit (MCU) 160. In addition, the OR gate element 153 may be configured to generate an output signal based on these two input signals and output the output signal to the first switching element 140. Accordingly, one of two input terminals of the OR gate element 153 may be connected to the feedback FET 152 or the first switching element 140, and the other input terminal of the OR gate element 153 may be connected to the MCU 160.

Figure 5:
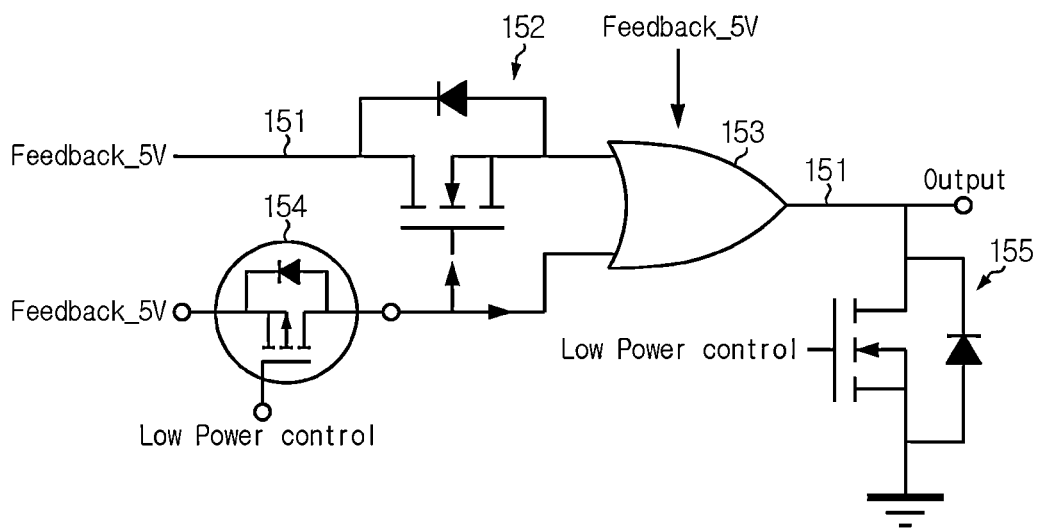
FIG. 5 is a diagram schematically showing some components of a battery management apparatus according to still another embodiment of the present disclosure.

FIG. 5 is a diagram schematically showing some components of a battery management apparatus according to still another embodiment of the present disclosure. In particular, FIG. 5 is a circuit diagram showing the configuration of the feedback module included in the battery management apparatus according to the present disclosure in more detail. In this embodiment, also, features different from the former embodiment will be described in detail, and features identical or similar to the former embodiment will not be described in detail.

Referring to FIG. 5, the feedback module may include an OR gate element 153, and different FET elements 152, 154 may be provided to two input terminals of the OR gate element 153. Here, one FET element may be the feedback switching element 152 described above, and the other FET element may be a feedback control switching element 154.

One end of the feedback control switching element 154, particularly an output terminal thereof through which a current flows out, may be connected to an input terminal of the OR gate element 153. In addition, the output terminal of the feedback control switching element 154 through which a current flows out may be connected to the gate terminal of the feedback switching element 152. Accordingly, by turning on or off the feedback control switching element 154, the feedback switching element 152 may be controlled to be turned on or off.

The feedback control switching element 154 may be a P-channel FET. In addition, a drain terminal of the feedback control switching element 154 may be connected to the gate terminal of the feedback switching element 152 and the input terminal of the OR gate element 153 together, and a source terminal of the feedback control switching element 154 may be connected to the first regulator 130. In this case, the power of the first regulator 130, for example 5V, may be supplied as a feedback power to the source terminal of the feedback control switching element 154 (Feedback_5V). In addition, the gate terminal of the feedback control switching element 154 may be connected to the microcontroller unit 160 to receive a control signal from the microcontroller unit 160 (Low Power Control). In particular, due to the characteristics of the P-channel FET, when the voltage of the gate terminal is equal to or lower than the threshold voltage, for example 0V, a current may flow from the source terminal of the feedback control switching element 154 to the drain terminal thereof. Meanwhile, the feedback switching element 152 may be an N-channel FET. In addition, the drain terminal of the feedback switching element 152 may be connected to the first regulator 130 to be supplied with a feedback power from the first regulator 130 (Feedback_5V). In addition, the source terminal of the feedback switching element 152 may be connected to the input terminal of the OR gate element 153. In particular, due to the characteristics of the N-channel FET, when the voltage of the gate terminal is equal to or greater than the threshold voltage, for example 5V, a current may flow from the drain terminal of the feedback switching element 152 to the source terminal thereof.

In addition, the feedback module 150 may include a feedback output switching element 155 at the output terminal of the OR gate element 153. In particular, the feedback output switching element 155 may be an N-channel FET. In this case, a drain terminal of the feedback output switching element 155 may be directly connected to the output terminal of the OR gate element 153, and a source terminal of the feedback output switching element 155 may be directly connected to the ground. In addition, a gate terminal of the feedback output switching element 155 may be connected to the microcontroller unit 160 to receive a control signal (Low Power Control).

Meanwhile, an input power of the OR gate element 153 may be supplied from the first regulator 130 (Feedback_5V).

According to this configuration of the present disclosure, the feedback power supplied from the first regulator 130 to the first switching element 140 may be controlled by the microcontroller unit 160. For example, if a power of 5V (Feedback_5V) is supplied from the first regulator 130 to the feedback module 150, the power of 5V may be input to the drain terminal of the feedback switching element 152, the source terminal of the feedback control switching element 154 and the power terminal of the OR gate element 153. At this time, if a control signal (Low Power Control) is input from the MCU to the feedback module 150, the voltage at the output terminal of the OR gate element 153 may be 0V since the feedback output switching element 155 is turned on. In this case, the first switching element 140 provided to the first power supply path 120 may be turned off.

Meanwhile, if a control signal is not input from the MCU 160 to the feedback module 150 in a state where the feedback power, for example a power of 5V, is supplied from the first regulator 130 to the feedback module 150, the feedback output switching element 155 may be turned off and the feedback control switching element 154 may be turned on. In this case, the power of 5V is supplied to the gate terminal of the feedback switching element 152, so that the feedback switching element 152 may be turned on. Therefore, since the power of 5V is supplied to the two input terminals of the OR gate element 153, the OR gate element 153 may output the power of 5V to the output terminal. In addition, due to the power output by the OR gate element 153, the first switching element 140 may be turned on.

As described above, according to the above embodiment, using a simple circuit configuration, it is possible to control whether or not to supply a power to the wake-up unit 110 by the microcontroller unit 160. In other words, depending on situations, the microcontroller unit 160 may be in a simple sleep mode in which the wake-up unit 110 is in a wake-up mode and only the microcontroller unit 160 is in a sleep mode, or may come into a deep sleep mode in which both the microcontroller unit 160 and the wake-up unit 110 are in a sleep mode.

Moreover, according to the embodiment of the FIG. 5, stability may be improved by applying a delay to a signal operation through the FET and the OR gate element. That is, according to the above embodiment, a problem that the control signal provided from the MCU 160 is not stable during power-up or power-down may be solved. However, in addition to the above embodiment, a configuration in which the supply of power to the wake-up unit 110 is controlled by a control signal of the MCU 160 may be implemented in various other ways.

Meanwhile, in a deep sleep mode in which both the microcontroller unit 160 and the wake-up unit 110 are in a sleep mode, a user may manually wake up the microcontroller unit 160. For example, in a deep sleep mode, the user may convert the wake-up unit 110 and/or the microcontroller unit 160 from a sleep mode to a wake-up mode by manually turning on the first regulator 130 and/or a second regulator, explained later.

Figure 6:
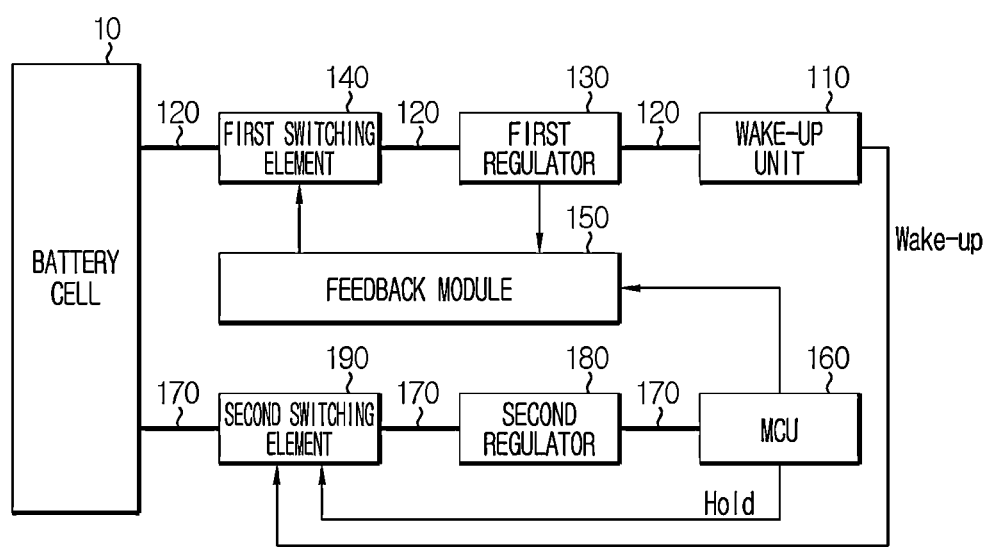
FIG. 6 is a diagram schematically showing a battery management apparatus according to still another embodiment of the present disclosure.

FIG. 6 is a diagram schematically showing a battery management apparatus according to still another embodiment of the present disclosure. Even in this embodiment, features different from the former embodiment will be described in detail.

Referring to FIG. 6, the battery management apparatus according to the present disclosure may further include a second power supply path 170, a second regulator 180, and a second switching element 190.

The second power supply path 170 may be provided between the battery cell 10 and the microcontroller unit 160 to provide a path through which a second operating power is supplied from the battery cell 10 to the microcontroller unit 160.

In addition, the second regulator 180 may be provided on the second power supply path 170 to adjust a voltage magnitude of the second operating power supplied from the battery cell 10. In particular, the second regulator 180 may adjust the magnitude of the second operating power to a voltage magnitude available by the microcontroller unit 160. For example, the second regulator 180 may be implemented as an LDO, so that the power is supplied to the microcontroller unit 160 after being dropped to a low voltage, for example 5V.

The second switching element 190 may be provided on the second power supply path 170. In addition, the second switching element 190 may be configured to turn on or off the flow of the second operating power on the second power supply path 170. For example, the second switching element 190 may be turned on so that the second operating power is supplied to the microcontroller unit 160 through the second power supply path 170. Alternatively, the second switching element 190 may be turned off to block the corresponding path so that the second operating power is not supplied to the microcontroller unit 160 through the second power supply path 170.

In this embodiment, the wake-up unit 110 may generate a wake-up signal and supply the wake-up signal to the second switching element 190. In addition, by providing the wake-up signal, the second switching element 190 may be turned on. That is, the wake-up unit 110 may be configured to turn on the second switching element 190 by means of the wake-up signal. In addition, if the second switching element 190 is turned on, the second operating power capable of operating the microcontroller may be supplied to the microcontroller unit 160.

Meanwhile, the microcontroller unit 160 may be configured to control both the first switching element 140 and the second switching element 190. In particular, the microcontroller unit 160 may be configured to turn off both the first switching element 140 and the second switching element 190.

For example, the microcontroller unit 160 may transmit a hold signal to the second switching element 190 so that the second switching element 190 continues to maintain the turn-on state. In addition, the microcontroller unit 160 may turn off the second switching element 190 so that the supply of the second operating power to the microcontroller unit 160 is blocked. In addition, the microcontroller unit 160 may turn off the first switching element 140 so that the supply of the first operating power to the wake-up unit 110 is blocked.

According to this configuration of the present disclosure, the microcontroller unit 160 may allow a power not to be supplied to the wake-up unit 110 such as the real time clock 111 or the CAN transceiver 112 as well as the microcontroller unit 160, thereby properly controlling current consumption. For example, the microcontroller unit 160 may determine whether only the microcontroller unit 160 may come into a sleep mode or both the microcontroller unit 160 and the wake-up unit 110 may come into a sleep mode. In addition, if it is determined that only the microcontroller unit 160 may come into a sleep mode, the microcontroller unit 160 may not turn off the first switching element 140 but turn off only the second switching element 190. Meanwhile, if it is determined that both the microcontroller unit 160 and the wake-up unit 110 may come into a sleep mode, the microcontroller unit 160 may allow both the first switching element 140 and the second switching element 190 to be turned off. In this case, since current consumption by both the microcontroller unit 160 and the wake-up unit 110 is limited, power waste of the battery pack may be prevented.

In particular, the microcontroller unit 160 may be configured to control the first switching element 140 and the second switching element 190 to be turned on or off in consideration of the SOC of the battery cell 10.

More specifically, the microcontroller unit 160 may be configured to turn off the first switching element 140 and the second switching element 190 in order if the SOC of the battery cell 10 is lower than a reference SOC. For example, when a given reference SOC of the battery pack is 10%, if an actual SOC is higher than 10%, for example 12%, the microcontroller unit 160 may turn off only the second switching element 190. Meanwhile, if the actual SOC is lower than the reference SOC, for example 8%, the microcontroller unit 160 may turn off both the first switching element 140 and the second switching element 190. In this case, since an operating power is not supplied to both the microcontroller unit 160 and the wake-up unit 110, excessive power consumption may be prevented.

Here, when turning off both the first switching element 140 and the second switching element 190, the microcontroller unit 160 may be configured to turn off the first switching element 140 first and then turn off the second switching element 190 later. If the second switching element 190 is turned off first, the second operating power supplied to the microcontroller unit 160 may be blocked, so that the microcontroller unit 160 may not properly turn off the first switching element 140. Therefore, if it is intended to turn off both the first switching element 140 and the second switching element 190, the microcontroller unit 160 may perform a turn-off operation so that to the first switching element 140 is turned off first and then the second switching element 190 is turned off later.

Meanwhile, in the above embodiment, the reference SOC, which is a reference value for the microcontroller unit 160 to determine whether to turn off only the second switching element 190 or turn off both the first switching element 140 and the second switching element 190, may be stored in advance in a memory unit included in the microcontroller unit 160 or a memory unit located outside the microcontroller unit 160.

Moreover, the microcontroller unit 160 may be configured to change the reference SOC depending on situations.

For example, the microcontroller unit 160 may be configured to change the reference SOC according to temperature. For example, if the temperature is out of a reference temperature range, the microcontroller unit 160 may be configured to increase or decrease the reference SOC.

As a more specific example, if the temperature of the battery pack is in a low temperature state lower than the reference temperature range, the microcontroller unit 160 may increase the reference SOC. For example, if the reference SOC is 10% within the reference temperature range, the microcontroller unit 160 may increase the reference SOC to 15% in a low temperature state. In this case, a problem that the battery pack is discharged more quickly in a low temperature situation may be alleviated. That is, in a low temperature situation, the battery pack may be rapidly discharged, and in this case, by increasing the reference SOC, the power supplied to the wake-up unit 110 may be blocked at a higher SOC.

Meanwhile, in the above embodiment, the battery management apparatus according to the present disclosure may further include a temperature measuring unit. The temperature measuring unit may be configured to measure the temperature around the battery cell 10 or the battery pack, and various temperature measuring devices known at the time of filing of this application may be employed. For example, the temperature measuring unit may be implemented using various temperature sensors.

The battery pack according to the present disclosure may include the battery management apparatus according to the present disclosure. The battery pack may further include a battery cell 10, a pack case, and the like, together with the battery management apparatus. In addition, the battery pack may further include a charge switch and a discharge switch on a high current path through which a charge/discharge current flows between the battery cell 10 and the pack terminal. Various components that may be included in the battery pack as described above other than the battery management apparatus according to the present disclosure may employ various components known at the time of filing of this application, and thus will not be described in detail here.

In addition, the battery management apparatus according to the present disclosure may be applied to a vehicle. Accordingly, the vehicle according to the present disclosure may include the battery management apparatus described above. In particular, the battery management apparatus according to the present disclosure may be included in a battery pack and mounted to a vehicle. Moreover, in an electric vehicle including a hybrid vehicle or a general vehicle, a battery pack is generally included, and when a vehicle is parked or consigned, the microcontroller unit 160 and/or the wake-up unit 110 may be in a sleep mode. In particular, if the battery management apparatus according to the present disclosure is applied, a problem that the battery pack for a vehicle is overdischarged or fully discharged may be effectively prevented.

In addition, the battery management apparatus according to the present disclosure may be applied to an electronic device. That is, the electronic device according to the present disclosure may include the battery management apparatus described above. The electronic device may be a device configured to receive a power, particularly a driving power, from a battery. For example, the electronic device may be a device such as a home appliance, a power tool or a portable terminal.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

10: battery cell
110: wake-up unit
111: real time clock,
112: CAN transceiver
120: first power supply path
130: first regulator
140: first switching element
150: feedback module
151: feedback path,
152: feedback switching element,
153: OR gate element,
154: feedback control switching element,
155: feedback output switching element
160: microcontroller unit
170: second power supply path
180: second regulator
190: second switching element

What is claimed is:

1. A battery management apparatus for managing a battery pack including a battery cell, comprising:
   a wake-up unit configured to generate and send a wake-up signal;
   a first power supply path between the battery cell and the wake-up unit, the first power supply path being configured to supply a first operating power from the battery cell to the wake-up unit;
   a first regulator on the first power supply path, the first regulator being configured to adjust a voltage magnitude of the first operating power supplied from the battery cell to a voltage magnitude available by the wake-up unit;
   a first switching element on the first power supply path, the first switching element being configured to turn on or off the flow of the first operating power on the first power supply path;
   a feedback module configured to supply an on/off signal from the first regulator to the first switching element; and
   a microcontroller unit configured to convert a sleep mode to a wake-up mode by receiving the wake-up signal from the wake-up unit, the microcontroller unit being connected to the feedback module to turn off the first switching element.

2. The battery management apparatus according to claim 1, wherein the wake-up unit comprises:
   a real time clock; and
   a controller area network (CAN) transceiver.

3. The battery management apparatus according to claim 1, wherein:
   the first switching element is implemented using a field-effect transistor (FET); and
   the feedback module is configured to supply an on/off signal to a gate terminal of the first switching element.

4. The battery management apparatus according to claim 1, wherein the feedback module comprises:
   a feedback path configured such that an operation signal is supplied from the first regulator to the first switching element; and
   a feedback switching element provided on the feedback path to turn on or off the feedback path.

5. The battery management apparatus according to claim 4, wherein the microcontroller unit is further configured to supply a control signal so that the feedback switching element is turned off.

6. The battery management apparatus according to claim 5, wherein the feedback module further comprises an OR gate element located on the feedback path, the OR gate element being configured to:
   receive;
      the operation signal supplied from the first regulator; and
      the control signal supplied from the microcontroller unit; and
   provide an output signal to the first switching element.

7. The battery management apparatus according to claim 1, further comprising:
   a second power supply path between the battery cell and the microcontroller unit, the second power supply path being configured to supply a second operating power from the battery cell to the microcontroller unit;
   a second regulator on the second power supply path, the second regulator being configured to adjust a voltage magnitude of the second operating power supplied from the battery cell to a voltage magnitude available by the microcontroller unit; and
   a second switching element on the second power supply path, the second switching element being configured to turn on or off the flow of the second operating power on the second power supply path,
   wherein the wake-up unit is further configured to generate and send the wake-up signal to the second switching element to turn on the second switching element.

8. The battery management apparatus according to claim 7, wherein the microcontroller unit is further configured to turn off the first switching element and the second switching element.

9. The battery management apparatus according to claim 8, wherein the microcontroller unit is further configured to turn off the first switching element and the second switching element in order when a state of charge (SOC) of the battery cell is lower than a reference value.

10. A battery pack, comprising the battery management apparatus according to claim 1.

11. An electronic device, comprising the battery management apparatus according to claim 1.

* * * * *